United States Patent
Watson et al.

(10) Patent No.: US 10,862,934 B2
(45) Date of Patent: *Dec. 8, 2020

(54) VEHICLE ENTERTAINMENT SYSTEM

(71) Applicant: Panasonic Avionics Corporation, Lake Forest, CA (US)

(72) Inventors: Philip Watson, Lake Forest, CA (US); Cedric Rhoads, Trabuco Canyon, CA (US); Nigel Blackwell, Lake Forest, CA (US); Steven Bates, Lake Forest, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/803,188

(22) Filed: Feb. 27, 2020

(65) Prior Publication Data
US 2020/0195700 A1    Jun. 18, 2020

Related U.S. Application Data

(63) Continuation of application No. 16/125,146, filed on Sep. 7, 2018, now Pat. No. 10,708,327, which is a
(Continued)

(51) Int. Cl.
*H04N 21/214*    (2011.01)
*H04L 29/06*    (2006.01)
(Continued)

(52) U.S. Cl.
CPC ........ *H04L 65/4084* (2013.01); *G06F 3/0482* (2013.01); *G06F 3/04842* (2013.01);
(Continued)

(58) Field of Classification Search
CPC . H04L 65/4084; H04L 43/0835; H04L 43/16; H04L 47/24; H04L 67/12;
(Continued)

(56) References Cited

U.S. PATENT DOCUMENTS 5,208,665 A    5/1993    McCalley et al.
5,404,567 A    4/1995    DePietro et al.
(Continued)

FOREIGN PATENT DOCUMENTS

WO    WO2008/029053    3/2008

OTHER PUBLICATIONS

Loureiro, Renzo Z. & Anzaloni, Alessandro, "Searching Content on Peer-to-Peer Networks for In-Flight Entertainment", Aerospace Conference, 2011 IEEE, Mar. 5-12, 2011.
(Continued)

*Primary Examiner* — John R Schnurr
(74) *Attorney, Agent, or Firm* — Klein, O'Neill & Singh, LLP (57) ABSTRACT

Methods and systems for a vehicle entertainment system are provided. One method includes receiving an input for a media file at a smart monitor on an aircraft, the aircraft having a plurality of smart monitors and a plurality of seat boxes communicating via a network that includes a first sub-network to connect a first group of the seat boxes, and a computing device that stores a plurality of media files, and a second sub-network to connect a second group of seat boxes and the computing device. The method further includes identifying by the smart monitor, a priority associated with the input for selecting a source for streaming the media file; streaming the media file from a first source located at the first data sub-network of the first sub-network, based on the priority, and if the media file is available from the first source; and streaming the media file from a second source coupled to the first source within the first sub-network, based on the priority, and if the media file is unavailable from the first source and available from the second source.

20 Claims, 9 Drawing Sheets

Related U.S. Application Data continuation of application No. 15/145,604, filed on May 3, 2016, now Pat. No. 10,097,603, which is a continuation-in-part of application No. 14/724,585, filed on May 28, 2015, now Pat. No. 9,961,373.

(60) Provisional application No. 62/018,077, filed on Jun. 27, 2014.

(51) Int. Cl.

| | |
|---|---|
| *H04L 29/08* | (2006.01) |
| *H04L 12/851* | (2013.01) |
| *H04L 12/26* | (2006.01) |
| *G06F 3/0484* | (2013.01) |
| *G06F 16/44* | (2019.01) |
| *H04N 21/442* | (2011.01) |
| *H04N 21/462* | (2011.01) |
| *H04N 21/63* | (2011.01) |
| *H04N 21/438* | (2011.01) |
| *G06F 3/0482* | (2013.01) |
| *H04N 21/472* | (2011.01) |

(52) U.S. Cl.
CPC .......... *G06F 16/44* (2019.01); *H04L 43/0835* (2013.01); *H04L 43/16* (2013.01); *H04L 47/24* (2013.01); *H04L 67/12* (2013.01); *H04L 67/42* (2013.01); *H04N 21/2146* (2013.01); *H04N 21/4383* (2013.01); *H04N 21/44209* (2013.01); *H04N 21/4622* (2013.01); *H04N 21/632* (2013.01); *H04N 21/47211* (2013.01)

(58) Field of Classification Search
CPC ....... H04L 67/42; G06F 16/44; G06F 3/0482; G06F 3/04842; H04N 21/2146; H04N 21/4383; H04N 21/44209; H04N 21/4622; H04N 21/632; H04N 21/47211
See application file for complete search history.

(56) References Cited

U.S. PATENT DOCUMENTS

| | | | |
|---|---|---|---|
| 5,973,722 | A | 10/1999 | Wakai et al. |
| 6,061,720 | A | 5/2000 | Karmel et al. |
| 6,192,416 | B1 | 2/2001 | Baxter |
| 7,103,324 | B2 | 9/2006 | Sanford et al. |
| 7,404,201 | B2 | 7/2008 | Takeuchi et al. |
| 7,620,364 | B2 | 11/2009 | Higashida et al. |
| 7,984,190 | B2 | 7/2011 | Rhoads |
| 8,171,337 | B2 | 5/2012 | Peters et al. |
| 8,283,801 | B2 | 10/2012 | Petipierre |
| 8,442,989 | B2 | 5/2013 | Massoulie et al. |
| 8,667,544 | B2 | 3/2014 | Bird et al. |
| 8,689,264 | B2 | 4/2014 | Petrisor |
| 9,043,846 | B2 | 5/2015 | Cline et al. |
| 9,210,450 | B2 | 12/2015 | Healy et al. |
| 9,226,000 | B1 | 12/2015 | Knight |
| 9,313,527 | B2 | 4/2016 | Couleaud et al. |
| 9,571,863 | B2 | 2/2017 | Healy et al. |
| 10,390,053 | B2 | 8/2019 | Boussemart et al. |
| 2005/0256616 | A1 | 11/2005 | Rhoads |
| 2006/0143662 | A1 | 6/2006 | Easterling et al. |
| 2006/0206565 | A1 | 9/2006 | Ganesan et al. |
| 2006/0271970 | A1 | 11/2006 | Mitchell et al. |
| 2009/0024754 | A1 | 1/2009 | Setton et al. |
| 2009/0034540 | A1 | 2/2009 | Law |
| 2009/0138920 | A1 | 5/2009 | Anandpura |
| 2011/0219409 | A1 | 9/2011 | Frisco et al. |
| 2012/0167148 | A1 | 6/2012 | Healy et al. |
| 2012/0210372 | A1 | 8/2012 | Kaufmann et al. |
| 2013/0055321 | A1 | 2/2013 | Cline et al. |
| 2013/0067330 | A1 | 3/2013 | Naik et al. |
| 2014/0032660 | A1 | 1/2014 | Nguyen |
| 2015/0046646 | A1 | 2/2015 | Elzind |
| 2015/0245109 | A1 | 8/2015 | Couleaud et al. |
| 2016/0248831 | A1 | 8/2016 | Watson et al. |
| 2017/0048558 | A1 | 2/2017 | Koupsin et al. |
| 2018/0220196 | A1 | 8/2018 | Slater et al. |

OTHER PUBLICATIONS

Office Action from USPTO dated May 14, 2019 for U.S. Appl. No. 16/003,995.
Final Office Action from USPTO dated Sep. 26, 2019 for U.S. Appl. No. 16/003,995.
Office Action from USPTO dated Dec. 3, 2019 for U.S. Appl. No. 16/150,143.
Notice of Allowance from USPTO dated Jan. 29, 2020 for U.S. Appl. No. 16/003,995.
Notice of Allowance from USPTO dated Apr. 1, 2020 for U.S. Appl. No. 16/003,995.
Final Office Action from USPTO dated Apr. 13, 2020 for U.S. Appl. No. 16/150,143.
Office Action from USPTO dated Feb. 7, 2018 for U.S. Appl. No. 15/145,604.
Final Office Action from USPTO dated May 7, 2018 for U.S. Appl. No. 15/145,604.
Notice of Allowance from USPTO dated Jul. 6, 2018 for U.S. Appl. No. 15/145,604.
Office Action from Patent Office of the Russian Federation dated Feb. 20, 2019 for Russian Application No. 2015125533.
Office Action from China National Intellectual Property Administration dated Apr. 2, 2019 for related Chinese Application No. 201510359186.4.
Office Action from USPTO dated Jul. 11, 2019 for U.S. Appl. No. 16/125,146.
Final Office Action from USPTO dated Oct. 16, 2019 for U.S. Appl. No. 16/125,146.
Notice of Allowance from USPTO dated Feb. 5, 2020 for U.S. Appl. No. 16/125,146.
Notice of Allowance from USPTO dated Oct. 5, 2020 for U.S. Appl. No. 16/150,143.

VEHICLE ENTERTAINMENT SYSTEM

CROSS-REFERENCE TO RELATED APPLICATIONS

This patent application is a continuation of US non-provisional patent application, Ser. No. 16/125,146, filed on Sep. 7, 2018, now U.S. Pat. No. 10,708,327, which is a continuation of U.S. non-provisional patent application Ser. No. 15/145,604, filed on May 3, 2016, now U.S. Pat. No. 10,097,603, which is a continuation-in-part (CIP) of U.S. non-provisional patent application Ser. No. 14/724,585, filed on May 28, 2015, now U.S. Pat. No. 9,961,373 that claims priority from prior U.S. provisional patent application Ser. No. 62/018,077, filed on Jun. 27, 2014, for which priority to the provisional patent application is expressly claimed. Priority to the foregoing non-provisional applications and the provisional application is expressly claimed. The disclosure of each of the prior non-provisional and provisional applications is hereby incorporated herein by reference in its entirety and for all purposes.

TECHNICAL FIELD

The present disclosure relates generally to vehicular entertainment systems and in particular to in-flight entertainment systems.

BACKGROUND

Entertainment systems for vehicles used in commercial passenger transport are frequently server-based. Specifically, a server stores content, e.g., media files, and provides the content via a network upon demand from client devices operated by users or passengers on the vehicle. Most often, the content is in the form of video and audio files, which are streamed to the client devices over the network. Accordingly, the server is central to operation of the entertainment system. For this reason, server-based systems in the in-flight entertainment field (IFE) are sometimes referred to as server-centric.

A disadvantage of server centric systems is that if the server becomes inaccessible the content stored on the server likewise becomes inaccessible for passengers or users of the client devices. Prior systems have addressed this disadvantage by providing alternative communication paths to the server. Hence, if there is a communication path failure, an alternate communication pathway still exists for accessing content on the server. Some systems provide multiple servers. Should one server become inaccessible, content can still be accessed via the other server. The more robust systems provide both multiple servers and redundant communication pathways.

Other types of IFE systems store content in client devices. In particular, IFE systems typically have client devices mounted at each seat for use by passengers. These systems are sometimes referred to in the IFE field as seat-centric. Seat-centric systems have an advantage in that they are not reliant on a server. However, there are disadvantages. For instance, client devices do not have the capability of a server and have far less storage capacity for content. In addition, there is a necessity for managing the content. Content is typically updated periodically as newer content becomes available. In vehicles having hundreds of seats, it is time consuming to load new content on each new client device.

Disclosed herein is a system that provides advantages of both server- and seat-centric systems.

SUMMARY

In one aspect, a system for providing entertainment on a vehicle for passengers is provided. The system includes a server disposed in the vehicle in which the server stores media files; smart monitors disposed in the vehicle that present media selections to passengers corresponding to the media files stored by the server and receive an input from a passenger for playing one of the selections; seat boxes disposed in the vehicle, each seat box including local content storage storing a subset of the media files stored by the server; and a network connecting the seat boxes and server in communication, with each seat box connecting a group of smart monitors in communication with the network. Program logic executed by each smart monitor in which after a smart monitor receives an input from a passenger for one of the selections, performs tasks including: determining if a media file corresponding to the passenger's input is available from a first source, and if available, requesting streaming of the media file from the first source; if the media file corresponding to the passenger's input is not available from the first source, determining if a media file corresponding to the input is available from a second source and if available, requesting streaming of the media file from the second source; and if the media file corresponding to the passenger's input is not available from the second source, determining if a media file corresponding to the input is available from a third source and if available, requesting streaming of the media file from the third source.

In another aspect, a system for providing entertainment on a vehicle for passengers is provided. The system includes a server disposed in the vehicle in which the server stores media files; smart monitors disposed in the vehicle to present media selections to passengers corresponding to the media files stored by the server and receive an input from a passenger for playing one of the selections; seat boxes disposed in the vehicle, each seat box including network-attached storage and storing a subset of the media files stored by the server in said network-attached storage; and a network connecting the seat boxes and server in communication, with each seat box connecting a group of smart monitors in communication with the network. Program logic executed by each smart monitor in which after a smart monitor receives an input from a passenger for one of the selections, performs tasks including: determining if a media file corresponding to the passenger's input is available from a first source, and if available, requesting streaming of the media file from the first source; and if the media file corresponding to the passenger's input is not available from the first source, determining if a media file corresponding to the input is available from a second source and if available, requesting streaming of the media file from the second source.

In yet another aspect, a system for providing entertainment on a vehicle for passengers is provided. The system includes a server disposed in the vehicle in which the server stores media files; smart monitors disposed in the vehicle configured to present media selections to passengers corresponding to the media files stored by the server and receive an input from a passenger for playing one of the selections; seat boxes disposed in the vehicle, each seat box including local content storage storing a subset of the media files stored by the server; and a wireless network connecting the seat boxes and server in communication, and a wired network each seat box in communication with a group of smart monitors in communication with the network. Program logic executed by each smart monitor in which after a smart monitor receives an input from a passenger for one of the selections, performs tasks including: determining if a media file corresponding to the passenger's input is available from a first source, and if available, requesting streaming of the media file from the first source; if the media file corresponding to the passenger's input is not available from the first source, determining if a media file corresponding to the input is available from a second source and if available, requesting streaming of the media file from the second source; and if the media file corresponding to the passenger's input is not available from the second source, determining if a media file corresponding to the input is available from a third source and if available, requesting streaming of the media file from the third source.

In yet another aspect, a method for an entertainment system of an aircraft is provided. The method includes receiving an input for a media file at a smart monitor on the aircraft, the aircraft having a plurality of smart monitors and a plurality of seat boxes communicating via a network that includes a first sub-network to connect a first group of the seat boxes, and a computing device that stores a plurality of media files, and a second sub-network to connect a second group of seat boxes and the computing device. The method further includes identifying by the smart monitor that receives the input, a priority associated with the input for selecting a source for streaming the media file; streaming the media file from a first source located at the first data sub-network of the first sub-network, based on the priority, and if the media file is available from the first source; and streaming the media file from a second source coupled to the first source within the first sub-network, based on the priority, and if the media file is unavailable from the first source and available from the second source.

In yet another aspect, a system, is provided. The system includes a computing device disposed on an aircraft to store a plurality of media files; a plurality of smart monitors disposed on the aircraft to present media selections to passengers corresponding to the plurality of media files; and a plurality of seat boxes disposed in the aircraft connecting the plurality of smart monitors and the computing device in a network. The network comprises a first sub-network for connecting a first group of the seat boxes and the computing device in communication, and a second sub-network connecting a second group of seat boxes and the computing device in communication. A plurality of data sub-networks are located within the first sub-network and the second sub-network, where each data sub-network includes at least a seat box connecting a group of smart monitors from the plurality of smart monitors in communication with the network. A smart monitor in a first data sub-network of the first sub-network receives an input for a media file, and program logic at the smart monitor executes instructions to: identify a priority associated with the input for selecting a source for streaming the media file; stream the media file from a first source located at the first data sub-network of the first sub-network, based on the priority, and if the media file is available from the first source; and stream the media file from a second source coupled to the first source within the first sub-network, based on the priority, and if the media file is unavailable from the first source and available from the second source.

Other aspects, details, and advantages will become apparent from the following description, taken in conjunction with the accompanying drawings, illustrating by way of example preferred and alternative embodiments.

BRIEF DESCRIPTION OF THE DRAWINGS

The drawing figures are not necessarily to scale and do not represent every feature, but are diagrammatic to enable those of ordinary skill in the art to make and use the disclosure without undue experimentation and do not limit the scope of the claims. The various aspects in accordance with the disclosure and advantages will therefore be understood by those of ordinary skill in the art by reference to the detailed description below together with the following drawings figures, wherein:

DETAILED DESCRIPTION

Described in the following paragraphs are various aspects of the present disclosure. The various aspects are implemented via a combination of hardware and software that include computing or information processing equipment having one or more processors configured to execute program logic or software stored on computer readable tangible, non-transitory storage media, e.g., magnetic memory discs, RAM, ROM, flash memory or solid state drives (SSDs). The program logic preferably configures the information processing equipment to provide the functionality as described herein.

Figure 1:
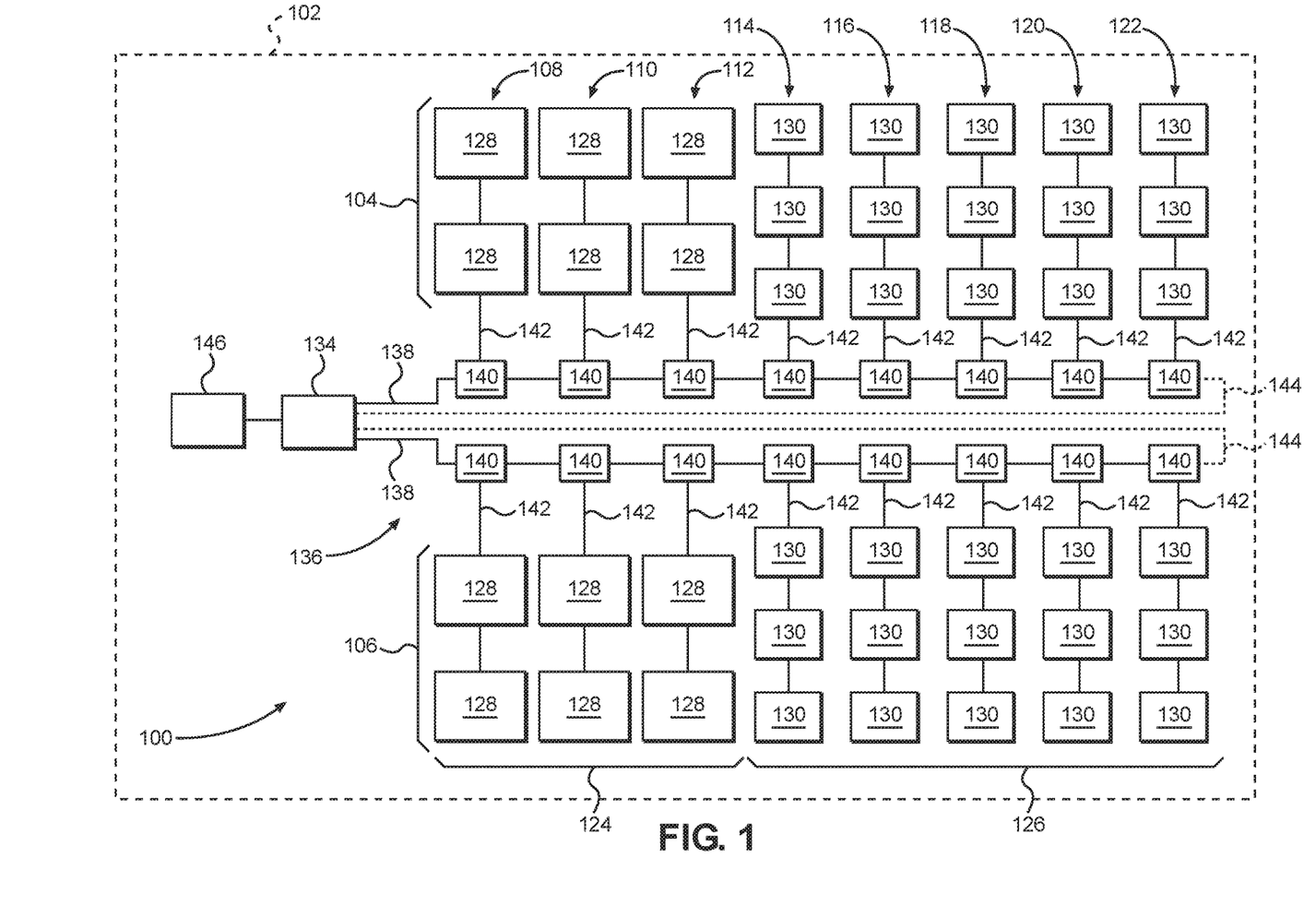
FIG. 1 is a schematic diagram of a vehicle entertainment system disposed in a vehicle provided for illustrative non-limiting purposes.

FIG. 1 schematically illustrates a vehicle entertainment system 100 disposed in a vehicle 102. The type of vehicle 102 is not limited and may be any kind of vehicle for carrying passengers, for example, an aircraft, bus, train, boat, submarine or spaceship. In this example, the vehicle 102 includes two seat columns 104 and 106 arranged symmetrically from one another across an aisle as typical in vehicles used for passenger transport. Each column 104 and 106 includes seat rows 108 through 122 extending generally orthogonally away from the aisle between the columns. It should be appreciated that FIG. 1 is a schematic drawing for explanatory purposes and passenger transport vehicles, such as aircraft used for commercial passenger transport, which can have hundreds of seats and consequently many more columns and rows than that illustrated in FIG. 1.

The seat rows 108 through 122 may have different number of seats depending on the class of seating of 122 and 124. For example, seat rows 108 through 112 nearer the front of the vehicle 102 may be premium class seating 122, such as business or first class and have larger seats 128 and/or more spacing between the seats 128. Seat rows 114 through 122 further back in the vehicle 102 may be economy class 126 and have smaller seats 130 and/or less spacing between the seats. Often a bulkhead, not shown, separates one class of seating 124 and 126 from another.

Figure 2:
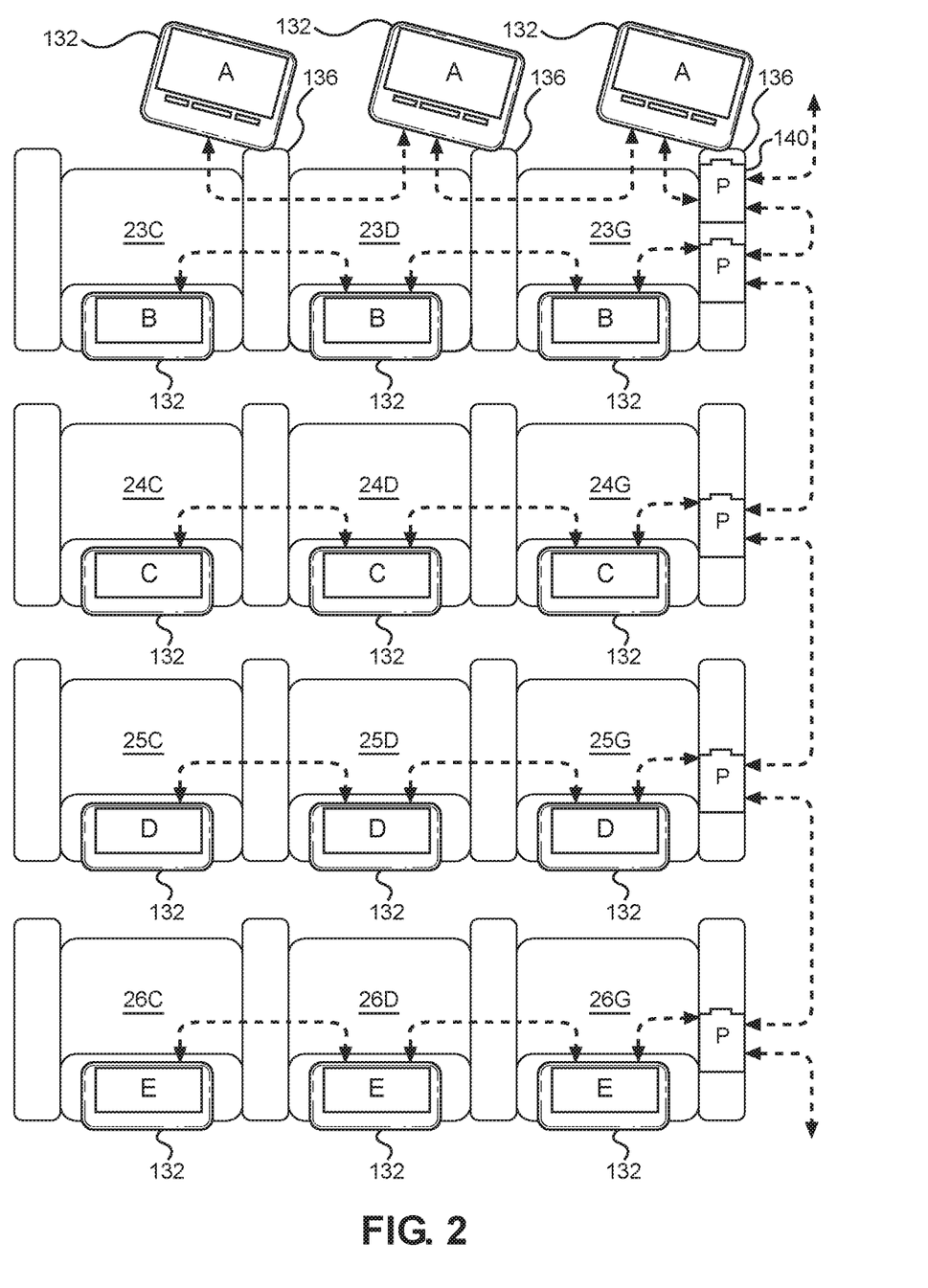
FIG. 2 illustrates a portion of the economy class section of the vehicle entertainment system of FIG. 1 and media subsets.

FIG. 2 schematically illustrates a portion of the economy class 126 section of seat column 106 from FIG. 1, namely rows 116 through 120. As shown in FIG. 2, the entertainment system 100 includes smart monitors 132, sometimes also called media players, video monitors or video display units (for clarity of explanation the smart monitors 132 are not shown in FIG. 1). Typically, a smart monitor 132 is mounted to the back of each seat 128 or 130 for viewing by a passenger or user in the seat immediately behind the seat to which the smart monitor 132 is mounted. For a seat 128 or 130 for which there is no seat forward thereof, the smart monitor 132 is frequently mounted to a bulk head in front of the seat. Alternatively, such a smart monitor 132 mounts to a seat arm 136 and is retractable into the seat arm when not in use.

The hardware for the smart monitors 132 is preferably of conventional design for use on vehicles. For example, smart monitors sold under the trademark ECO from Panasonic Avionics Corporation of Lake Forest, Calif., may be used. Smart monitors of other types and from other manufacturers may be used as well. The adaptive aspects disclosed herein are not limited to any particular smart monitor type. The smart monitors 132 as described herein include software or program logic to perform as described in connection with the flow charts shown in FIGS. 4 and 5. In addition, the smart monitors 132 will stream a file therefrom to another smart monitor via a request communicated over a network. Returning to FIG. 1, the smart monitors 132 are configured with software or program logic to present media selections to passengers or users, corresponding to media files stored on a server or servers 134.

The server 134 is of conventional hardware design and commercially available, for example, from Panasonic Avionics Corporation of Lake Forest, Calif. Servers from other manufactures may be used as well. FIG. 1 illustrates an aspect having a single server 134, but other aspects may have multiple servers 134, such as the aspect described in connection with FIG. 5. The server 134 preferably includes at least one solid-state drive (SSD) (or any other type of storage media) and one or more high performance processors to enable the server to simultaneously stream 720p high definition audio and video to hundreds of smart monitors 132 simultaneously with acceptable viewing performance, i.e., without excessive buffering or stuttering. Generally, this requires a bit rate of about 5 Mbps for a 720p audio and video stream having 12 language selections. Panasonic Avionics Corporation has servers available that support from 300 Mbps to 1600 Mbps, depending on the class of server. A 1600 Mbps server can support up to 320 streams at 5 Mbps per stream. Some smart monitors are larger however, and can support up to 1080p displays, which typically require more than 5 Mbps per stream. The various aspects disclosed herein are not limited to any specific resolution of the smart monitors.

An SSD enables media files to be rapidly loaded or copied onto the server 134 to minimize vehicle down time. Commonly, server 134 used on an aircraft for commercial passenger transport may be able to store from between 300 gigabytes to 400 gigabytes of media files, with the average being around 350 gigabytes, for streaming to smart monitors 132. The media files are replaced periodically on the server 134, usually monthly or weekly, as newer content becomes available. Each server 134 is normally capable of storing between one and two terabytes of date in total, and usually around 1.6 terabytes. The various aspects disclosed herein are not limited to any server storage capacity.

The smart monitors 132 include a non-volatile memory for storing media files, such as a memory card according to the Secure Digital standard, i.e., an SD flash memory card. In particular, ECO smart monitors currently available from Panasonic Avionics Corporation have SD cards according to the eXtended-Capacity standard, i.e., SDXC flash memory cards. The total memory capacity is usually 64 GB, but may vary according to the class of seating in the vehicle 102, with smart monitors for premium class seating frequently being provided with greater capacity memory cards. It is anticipated that as memory prices decrease and/or technology improves, higher capacity cards will be provided and/or other types of non-volatile memory such as an SSD or other types of memory. System files in the smart monitors 132 normally require about 14 GB of storage, i.e., applications, a graphical user interface (GUI), metadata, operating system, etc. The remaining portion of the non-volatile memory is used for storage of media files locally on a smart monitor 132, which is preferably at least 50 GB or slightly more, depending on the space required for system files.

A network 136 connects the smart monitors 132 and server 134 in communication with another. The network 136 is preferably a conventional local area network (LAN) using Ethernet for communication between the smart monitors 132 and server 134. The network includes higher speed sub-networks 138 extending from the server 134 along the columns 104 and 106. Preferably, the higher speed sub-networks 138 provide throughput of at least gigabyte Ethernet using conventional 1000BASE-T or Copper-Gigabit wiring/cabling. The higher speed sub-networks 138 are referred to hereinafter as column sub-networks 138.

The column sub-networks 138 connect to seat boxes 140 that may also include a switch. A lower speed data sub-network 142 extends from each seat box 140 and extends along the nearest row of seats thereto (seat rows 108, 110, 112, 114,116,118, 120, or 122). The lower speed sub-networks 142 may each provide at least 100 Mbits/s of throughput via conventional Fast Ethernet connections using 100BASE-TX wiring. The lower speed sub-networks 142 form seat LANs or seat sub-networks of at least two smart monitors 132, as opposed to the earlier described column sub-networks 138. The various adaptive aspects described herein are not limited to any particular network protocol.

In one aspect, the seat boxes 140 supply both network connections and power to the smart monitors 132 connecting thereto. The seat boxes may be of conventional hardware and are frequently referred to in the in-flight entertainment field as Power-Network Boxes (PNBs) as the seat boxes 140 provide both power and network connections. Alternatively, the seat boxes 140 may be referred to as Seat Interface Boxes (SIBs). If larger smart monitors are used, such as smart monitors sold under the trademarks of ELITE SERIES V2 and ALTUS by Panasonic Avionics Corporation, the seat boxes 140 may provide network connections only, with power provided separately via seat electrical boxes (SEBs) or seat power modules (SPMs). Power Network Boxes, Seat Interface Boxes, Seat Electrical Boxes and Seat Power Modules are all available from Panasonic Avionics Corporation. The term seat box as used herein includes switches that provide both power and network connections for the smart monitors 132 and switches that provide only network connections.

Optionally, the network 138 may include a redundant communication connection or connections 144 for use in the event of a communication path failure. In this regard, a pathway failure along either column sub-network 138 would cut communications between the server 134 and smart monitors 132 in that column 104 or 106 for seats 128 and 130 downstream of the failure. Therefore, a redundant communication connection 144 may extend between the last seat box 140 in each column 104 and 106 and the server 134. The redundant communication connection 144 provides an alternative communication path in the event of a failure in a column sub-network 138 to prevent smart monitors 132 from being cut off from communication with the server 134.

In one aspect, the redundant communication connections 144 provide full communication redundancy and provide gigabyte Ethernet using conventional 1000BASE-T or Copper-Gigabit wiring/cabling. For cost reduction, the redundant communication connections 144 may be lower data rate connections and reserved only for public announcements and map data from the server 134. In this regard, the entertainment system 100 includes an interface or crew terminal 146 for use by vehicle personnel to control the entertainment system 100 and communicate public announcements to the smart monitors 132. Redundant communication connections 144 provide for an alternative way to broadcast public announcements to the smart monitors 132 in the event of a communication failure.

Figure 3:
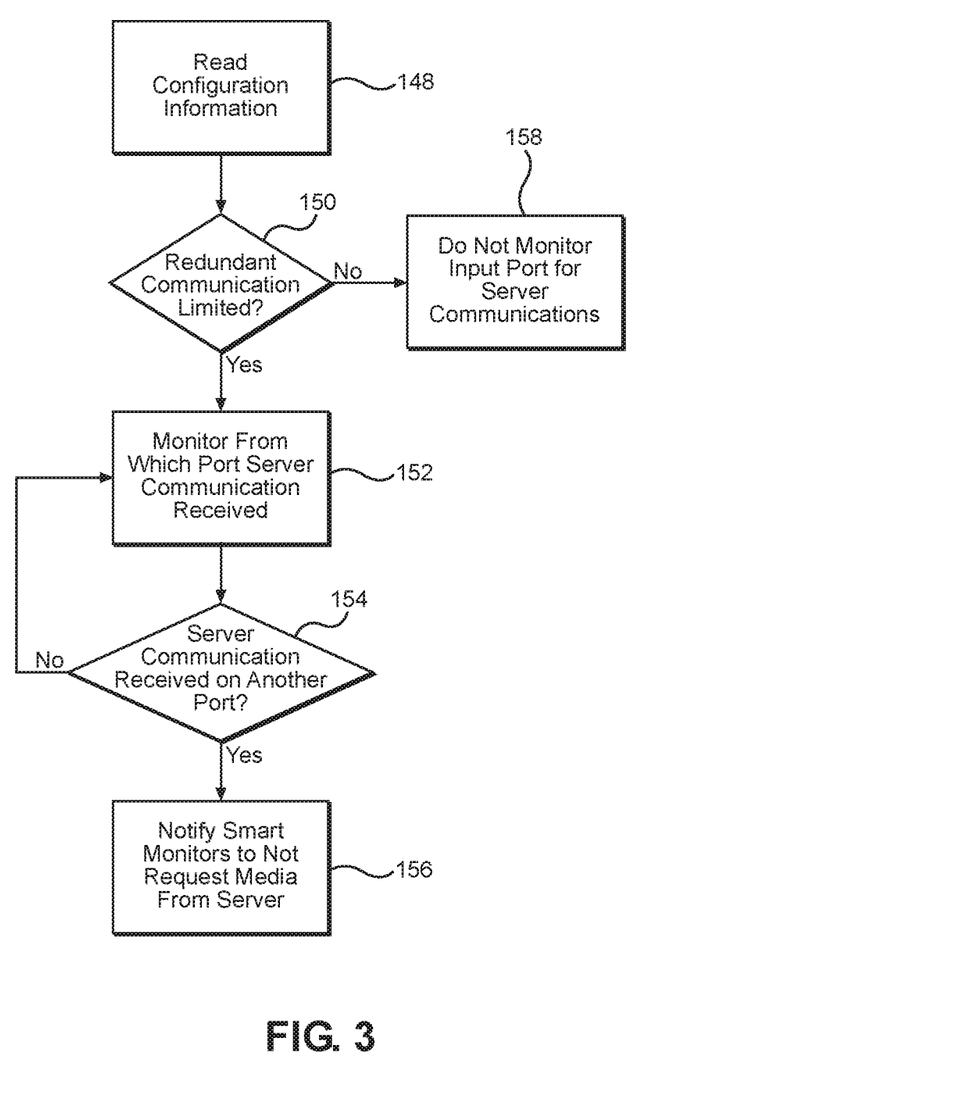
FIG. 3 is a flow chart of example software or program logic executed by the seat boxes of FIG. 1 for illustrative non-limiting purposes.

Each seat box 140 includes a processor and memory, in which the processor executes software or program logic. As shown in FIG. 3, for use in systems 100 that may include limited redundant communication connection or connections 144, the program logic initially reads configuration file information as indicated in processing box 148. The configuration information may be data pre-stored in the seat box 140 upon installation in the vehicle 102, a file downloaded from the server 134, or a simple message broadcast along the network 138. Based upon the configuration information, the logic determines in decision block 150 whether redundant communication is limited. If redundant communication is limited, the program logic monitors from which port communications are being received from the server 134 as indicated in process block 152.

In particular, the seat box 140 can distinguish from which port communications are being received from the server 134. With respect to FIG. 1, the communications from the server 134 would normally be received by the forward port of each seat box 140 (the port nearest the front of the vehicle 102). In the event of a communication pathway failure resulting in the use of a redundant communication connection 144, server communications would be received on the other port.

After monitoring begins, the logic determines if there is a change in which port server communications are being received from in decision block 154. If there is no change, monitoring continues. If there is a change, the program logic notifies smart monitors 132 in that seat box's row, i.e., the seat LAN formed by that seat box 140, to not request media files from the server in process block 156. This is only when redundant communication connections 144 are limited as determined in the previous decision block 150. If the redundant communication connections 144 are not limited, port monitoring is not performed as indicated in process block 158.

If a redundant communication connection 144 is used and it is limited, there may be insufficient bandwidth to stream media over the connection 144. Thus, the smart monitors 132 connecting through the seat box 140 that detected the port change, are notified to not request media from the server 134. Moreover, the smart monitors 132 may also be optionally notified to mute audio. This is to make public announcements sent via the redundant communication connection 144 more noticeable to passengers.

Figure 4:
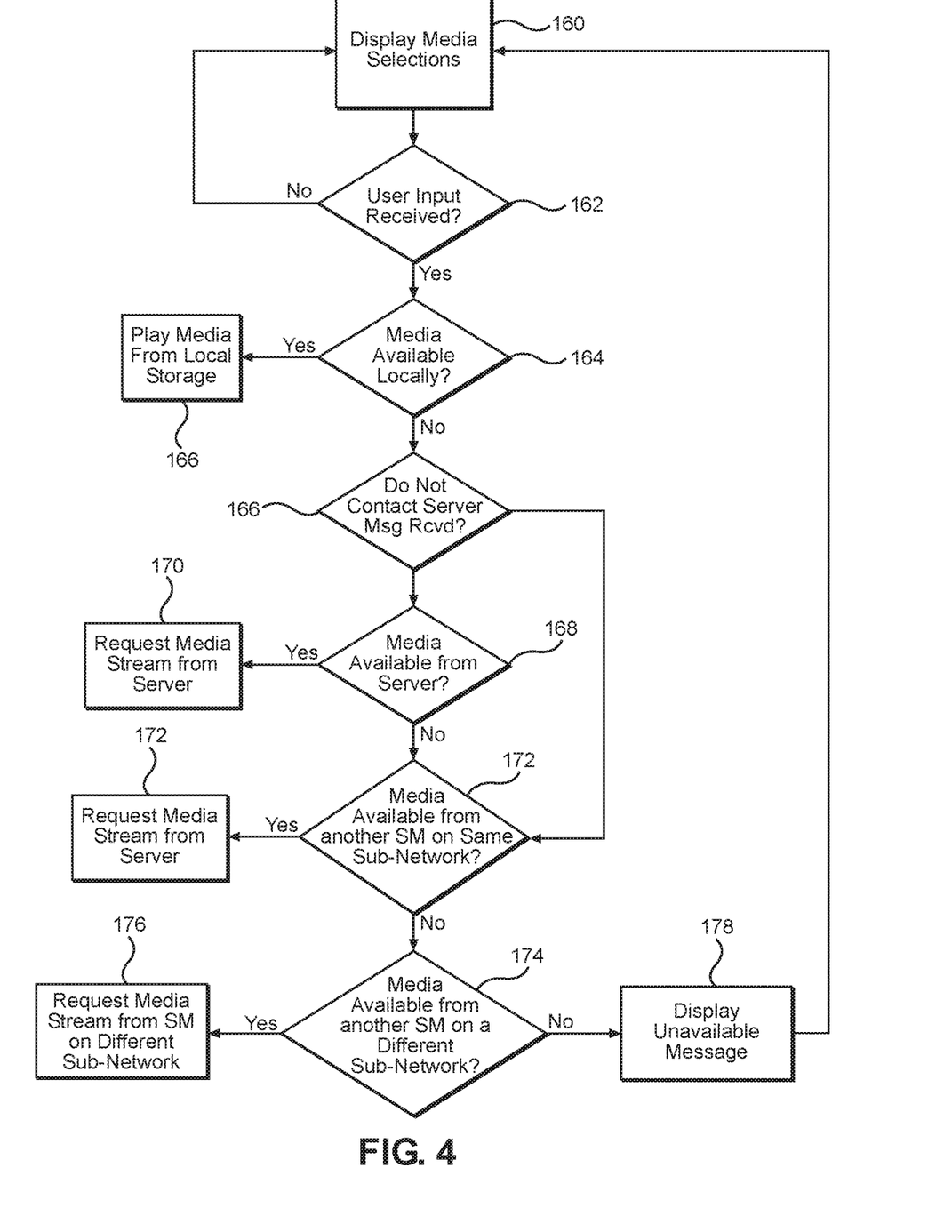
FIG. 4 is a flow chart of example software or program logic executed by the smart monitors of FIG. 3 in responding to an input for a media request from a user or passenger for illustrative non-limiting purposes.

Referring to FIG. 4, each smart monitor 132 includes software or program logic to display media selections as indicated in process box 144 of the flow chart. In this state, the program logic waits for an input from a user or passenger to choose one of the media selections as indicated in decision box 162. The logic initially checks in decision block 164 to determine if a media file corresponding to the selection is available from a first source. The sources include local content storage of the smart monitor 132, the server 134, or another smart monitor 132 or the seat box 140 described below in detail with respect to FIGS. 8 and 9.

In one aspect, the first source is whether the media file is stored locally in the smart monitor's 132 non-volatile memory, i.e., local content storage such as a memory card. If so, the logic plays the media file from the first source, i.e., from local content storage as shown in process block 166 of the example program logic illustrated in FIG. 4. Playing media from local content storage has the advantage of minimizing network traffic and generally does not require buffering of the stream. Other aspects may have a different first source, such as the server 134.

If a media file corresponding to the media file selection is not available from the first source, i.e., in local content storage for this aspect, the program logic proceeds to decision block 166. The logic in decision block 166 determines if a notification has been received to not contact the server 134 for media, such as from a seat box 140. This is an optional decision block for use with systems that may have limited redundant communication connections 144. If connections are fully redundant and not limited, decision block 166 is not necessary.

If such a notification has not been received, the program logic proceeds to decision block 168. The program logic in decision block 168 determines whether a media file corresponding to the selection is available from a second source. In the example shown in FIG. 4, the second source is the server 134. If available, the program logic plays the media file from the server. In particular, the logic requests the server 134 to stream the media file to the smart monitor 132 over the network 136 as indicated in process block 170. Upon receipt of the stream, the smart player 132 plays the media. Alternative aspects, may have a different second source, such as another smart monitor 128 or 130 or possibly local storage from a wireless access point.

If the media file is not available from second source, i.e., the server 132 in this aspect, the program logic in decision block 172 determines whether a media file corresponding to the selection is available from a third source. In this aspect, the third source is another smart monitor 132 on the same column sub-network 138. That is, if a media file corresponding to the selection from the user/passenger is not available from the server and not available in local content storage, the smart monitor program logic searches or looks for the media on another smart monitor 132. In particular, it looks for the media on a smart monitor 132 on the same column sub-network 138 as the smart monitor 132 searching for the media file. This minimizes traffic on the network 136, helps to maintain acceptable stream speeds, and reduce load on the server 134. If the media file is available from another smart monitor 132 on the same column sub-network 138, the smart monitor 132 communicates a request to the other smart monitor to stream the media file over the network to the smart monitor that communicated the request as indicated by process block 172.

If the media file is not available from another smart monitor 132 on the same sub-network column 138, the smart monitor needing the file determines in decision block 174 whether the media file is available from a smart monitor on a different sub-network column 138. If the media file is available, the smart monitor 132 communicates a request to the other smart monitor on the different sub-network column to stream the media file over the network to the smart monitor that communicated the request as indicated by process block 176. If the file is not available, an unavailable indication is provided to the user or passenger, such as by displaying a message as indicated by process block 178. Thereafter, the logic returns to displaying media selections in process block 160 to wait for another input.

Finally, if it is determined in the previous decision bock 166 that a message has been received to not contact the server 134, the logic skips determining whether the media file is available from the server. Instead, the logic proceeds to the decision block 172 that determines whether the media file is available from another smart monitor 132 on the same column sub-network 138.

It is not necessary to seek media files from smart monitors 132 on the same column sub-network. However, streaming from a smart monitor 132 on the same column sub-network reduces overall network traffic and increases stream rates. Once streaming has began from one smart monitor 132 to another, the smart monitor 132 receiving the stream includes program logic that monitors for acceptable packet loss. If the packet loss is determined to be in excess of an acceptable level, the program logic requests the media from another source, i.e., a different smart monitor 132 or the server 134 if communication with the server 134 is available.

In some systems 100, there may be a selection of pay-per-view media files. The program logic in the smart monitors 132 preferably decline requests for pay-per-view media files if there is no communication available with the server 134. This is to comply with the standards set forth by the Payment Card Industry (PCI) to ensure a secure environment for payment information. In this regard, the PCI Data Security Standard (DSS) currently prohibits storing credit card data on smart monitors.

Based on testing, smart monitors 132 currently available under the ECO trademark from Panasonic Avionics Corporation have the ability to serve up to six streams of 720p audio and video stream comprising 12 language selections at approximately 5 Mbps per stream with acceptable performance. This is while the smart monitor is playing a steam from its local content storage or from another source, i.e., the server 134 or another smart monitor 132. Hence, the maximum quantity of smart monitors 132 that can be served by a single smart monitor 132 is six with ECO type smart monitors. This is the highest conservative quantity that does not have an observable adverse impact to a user or passenger of the smart monitor 132 that is serving the streams while running applications, such as games, operating the graphical user interface, or playing a media file, etc. Each smart monitor 132 includes program logic for operating a local media server to stream up to the highest conservative quantity of steams as described previously. It is expected that this quantity will increase as technology improves the hardware available, compression techniques, and/or if higher performance smart monitors 132 are used. Alternatively, the maximum quantity would be limited to less than six if less capable smart monitors 132 are used.

The preference for whether a source is first, second, third or later in priority for where a smart monitor looks for a media file may be read from a configuration file. The configuration information may be data pre-stored in the smart monitors 132 upon installation in the vehicle 102, a file downloaded from a server 134, or a simple message broadcast along the network 138. In some aspects with high performance servers and/or high speed networks, the first source may be a server 134. Other aspects may not have a server 134 and therefore the first source is local content storage of the smart monitor 132 and the second source is another smart monitor or vice-versa.

Figure 5:
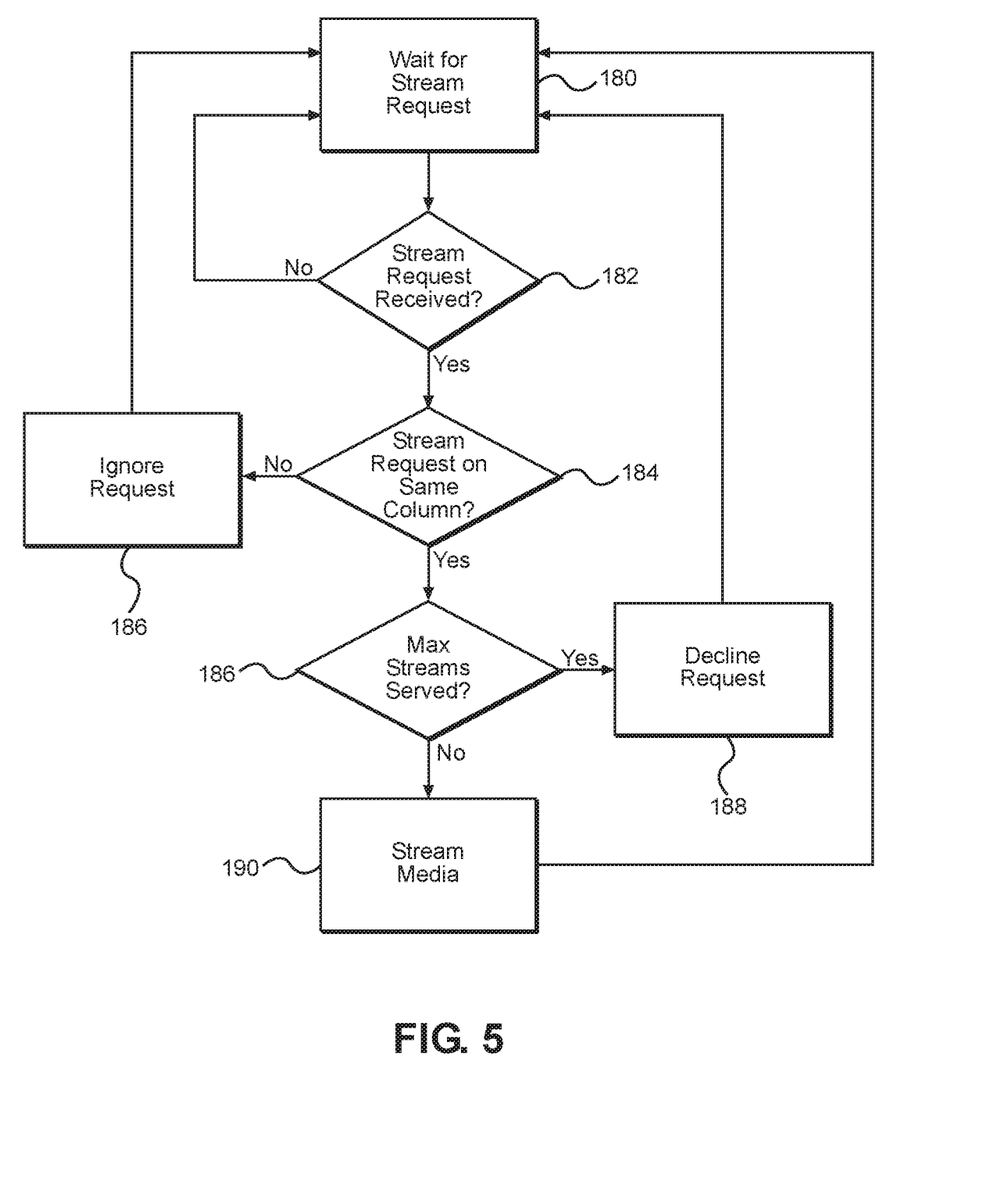
FIG. 5 is a flow chart of example software or program logic executed by the smart monitors of FIG. 3 in responding to a request from another smart monitor for streaming media for illustrative non-limiting purposes.

FIG. 5 illustrates the program logic on each smart monitor for operating a local media server. In process box 180, the program logic waits or listens for a request to stream a media file over the network 136. If no stream request is received or detected in decision block 182, the logic continues monitoring for a stream request in process block 180.

In some aspects of the system 100 it may be desired to limit streaming from one smart monitor 132 to another, to only on the same column sub-network 138. If so, the logic proceeds to an optional decision block 184 that determines if the stream request is from a smart monitor 132 on the same column sub-network 138 as the smart monitor 132 that received the request. If it is not, the logic ignores the request as indicated in process block 186 and the logic returns to waiting or listening for a stream request in the initial process block 180.

If streaming is permitted from a smart monitor 132 on one column sub-network 138 to a smart monitor 138 on another column sub-network 138, this optional decision block 184 is not necessary. In this situation, or if the request is from a smart monitor 132 on the same column sub-network 138 in the case of the optional decision block 184, the logic inquires whether the maximum quantity of streams is being served in decision block 186.

If the maximum quantity of streams is being served, the request is declined or ignored as indicated in process block 188. Otherwise the media file corresponding to the request is streamed as indicated in process block 190. After accepting the request and streaming the media or declining the request, the logic returns to its default state in process block 180 of monitoring for a stream request. In addition, for some aspects, the logic may prioritize requests from smart monitors 132 in premium class seating. For example, the logic may accept up to one less than the maximum quantity of streams possible to serve, except for requests from smart monitors 132 in premium class. In this way, a reserve would be established for users or passengers in premium class, should the server 134 become unavailable.

An individual smart monitor 132 does not have the storage capacity of the server 134 for storing media. Accordingly, each smart monitor 132 can only hold a subset of the total media available from the server 134. To increase the media available from the smart monitors in the event the server 134 becomes unavailable, different subsets of media are downloaded to the smart monitors 132.

For example, as indicated in FIG. 2, the smart monitors 132 for passengers/users in row 23 are loaded with media subset A. Since these smart monitors are in the first row of economy class 126, these are smart monitors 132 that mount to a seat arm 136.

Media subset B is loaded into the smart monitors 132 for the users/passengers in row 24. These are the smart monitors 132 mounted to the back of the seats in row 23. The smart monitors 132 for the users/passengers in row 25 are loaded with media subset C, and so on. In total, five media subsets A, B, C, D and E are illustrated in FIG. 2 as an illustrative non-limiting example. Assuming that each smart monitor 132 has fifty gigabytes of local storage, a maximum of 250 GB of media content could be made available for streaming in the event the server 134 becomes unavailable.

As discussed previously, a server 134 on average stores around 350 GB of media. All of the media stored on the server 134 could be stored in the smart monitors 132 if enough media subsets were defined and there are a sufficient number of rows. Alternatively, increased storage for the smart monitors 132 could be provided.

However, only the more popular content is typically selected by the users/passengers for viewing. Around 60% to 80% of the users/passengers select the same 10% to 30% of the same content to view. Therefore to reduce loading times, media subsets may be selected to store at least 70% of the more popular content. Generally, 80% of the users watch about 20% of the content. Alternatively, additional media subsets may be defined or smart monitors may be used with increased storage space for local content such that 100% of the media files on the server are available collectively distributed over the smart monitors 132.

The media is initially loaded into the server 134 using conventional techniques. Usually, this is performed by transferring the media from a portable media loader or onboard media loader having the media stored thereon in non-volatile memory, such as an SSD, and copying the media onto the server 134 via a wired connection through a media load port on the server, for example, a connection through a universal serial bus (USB). Wired connections currently provide the fastest loading times. Alternatively, the media may be transferred via a wireless connection, such as through a standard corresponding to the IEEE 802 family or through a satellite connection.

Media is thereafter loaded on to the smart monitors 132 in multiple, parallel streams using Internet Group Multicast Protocol (IGMP) to multicast each media subset to the smart monitors 132. Referring to FIG. 2, each media subset is identical in each smart monitor 132 of a seat sub-network or LAN. Specifically, all of the smart monitors 132 for the seats in row 23 have media subset A. This is so that the seat box 140 for the row 23 can load all of the same media files to the smart monitors 132 connected thereto. This minimizes the load time as the network traffic substantially flows in only one direction. For a LINUX system, multiple Network Block Device channels are formed that operate simultaneously to transfer the media files from the sever 134 to the smart monitors 132. The minimum loading time for 50 GB per smart monitor 132 at 70 Mbs is about 98 minutes. Some additional time afterwards is typically required for transferring any parts of media files that a smart monitor 132 may have missed.

Some smart monitors 132 may have greater storage for local content, such as smart monitors provided for premium class seating. However, to minimize loading time, all of the smart monitors 132 are provided with the predefined media subsets, e.g., media subsets A through E as illustrated in FIG. 2. More particularly, each smart monitor 132 stores media files requiring an amount of storage space in bytes approximately equal on each of the other smart monitors 132. The storage space is not exactly the same on each smart monitor 132 because some media files are larger than others and it is not desirable to split media files to have media subsets that require exactly the same amount of storage space.

Loading time can be further decreased by first loading a media subset into the server 134 and thereafter multicasting the media subset to the smart monitors 132 assigned to that media subset. Simultaneously, the next media subset is loaded on the server 134. Hence, loading of the server 134 and smart monitors 132 overlaps, except for the last media subset.

Figure 6:
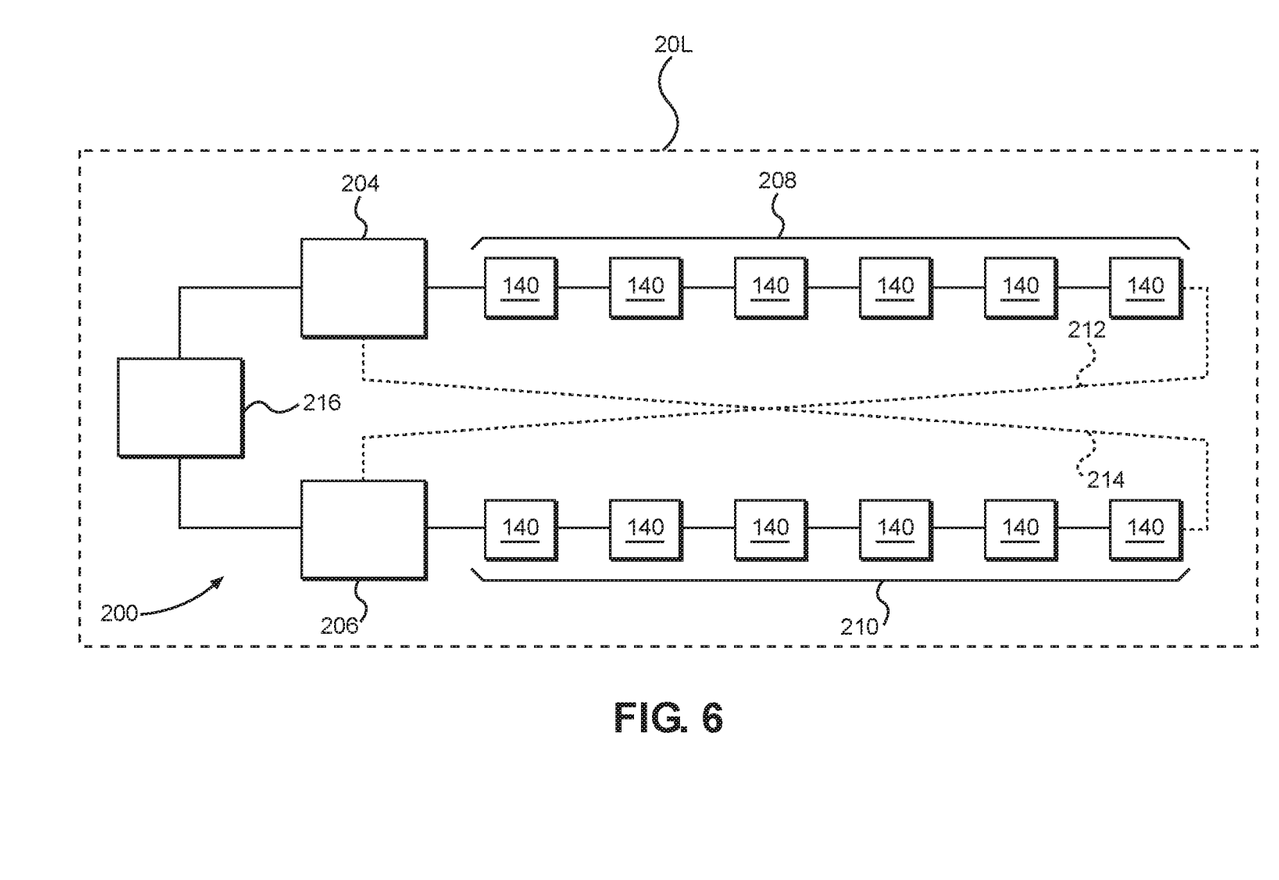
FIG. 6 is a schematic diagram of another exemplary vehicle entertainment system having multiple servers provided for illustrative non-limiting purposes.

FIG. 6 illustrates a part of a system 200 for a vehicle 202. The system 200 includes a pair of servers 204 and 206. The system 200 includes a network in which each server 204 and 206 provides media for a different column sub-network 208 and 210. In particular, the upper server 204 communicates with upper column sub-network 208 and the lower server 206 communicates with the lower column sub-network 210. For clarity of explanation, FIG. 6 only illustrates seat boxes 140 and does not show the smart monitors 132 connecting to the seat boxes 140. The system 200 further includes redundant communication connections 212 and 214. The redundant communication connection from the upper seat column sub-network 208 connects to the lower server 206. The redundant communication connection 214 from the lower sub-network 324 connects to the upper server 204.

The redundant communication connections 212 and 214 preferably provide full redundancy and permit streaming of video and audio in the event of a server or communication path failure. Moreover, even greater redundancy is provided as there are two servers 204 and 206 and the redundant communication connections cross connect to the servers. Hence, if one server 204 or 206 fails, the cross-over connection permits the other server to serve the column sub-network 208 or 210 of the failed server. An aircraft or control interface 216 connects to both servers 204 and 206 so that vehicle personnel can control the system 200 through a single interface.

Figure 7:
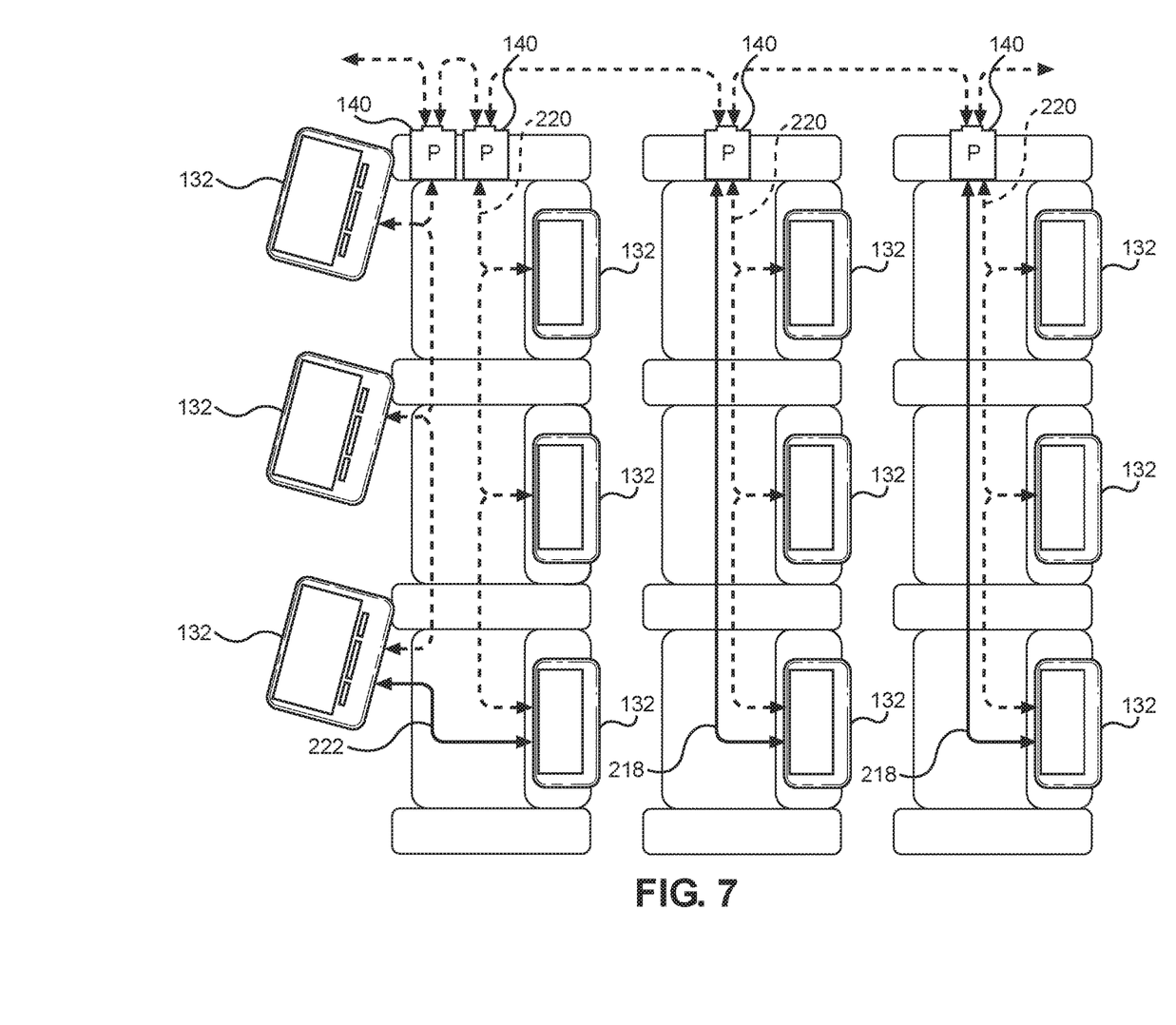
FIG. 7 illustrates a portion of the vehicle entertainment system of FIG. 1 to show redundant communication connections between seat boxes and smart monitors and also between one smart monitor and another for illustrative non-limiting purposes.

FIG. 7 illustrates redundant communication connections between the smart monitors 132 and the seat boxes 140. Specifically, each seat box 140 includes an additional port for a return or redundant communication connection 218. When there is no communication path failure the smart monitors 132 connect to the network through the path identified by reference numeral 220. Referring to the right side of FIG. 7, smart monitors 132 downstream therefrom connect to the network through an adjacent smart monitor 132. If there is a communication failure, the redundant communication pathway 218 is used. This prevents a failure in a smart monitor 132 or the communication pathway from isolating other smart monitors 132 from the network.

The left side of FIG. 7 illustrates a special case for a row adjacent a bulkhead or other special case. In this situation, a redundant communication connection 222 is provided between the last smart monitor 132 of the row adjacent the bulkhead and the last smart monitor 132 of the row behind.

Figure 8:
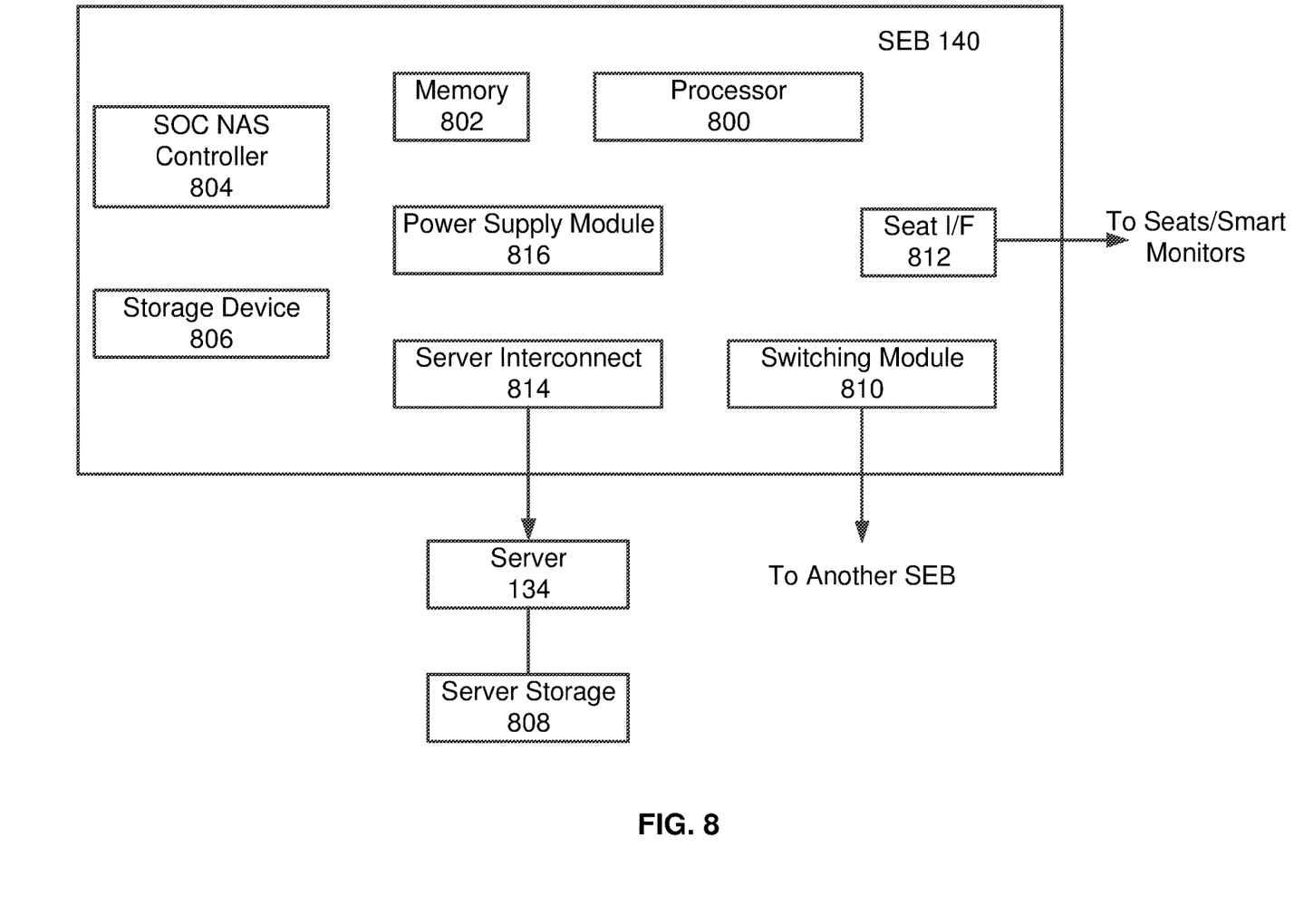
FIG. 8 shows an example of a seat box, according to one aspect of the present disclosure.

FIG. 8 shows an example of a seat box 140 with a hardware based processor 800, according to one aspect of the present disclosure. Processor 800 includes one or more programmable general-purpose or special-purpose microprocessors, digital signal processors (DSPs), programmable controllers, application specific integrated circuits (ASICs), programmable logic devices (PLDs), or the like, or a combination of such hardware devices. Processor 800 executes programmable instructions (for example, seat box firmware instructions) out of a memory 802. Memory 802 may include a random access memory (RAM), read-only memory (ROM), flash memory, or the like, or a combination of such devices. Memory 802 includes the main processing memory of the seat box 140 and may be accessible by an interconnect (not shown), for example, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type. The various adaptive aspects disclosed herein are not limited to any interconnect type.

In one aspect, the seat box 140 includes or interfaces with a system on chip (SOC), network attached storage (NAS) controller (may also be referred to as controller) 804 that manages content stored at a storage device 806. In one aspect, controller 804 is operationally coupled to the seat box 140 via a PCI-Express bus or any other type of interconnect. The storage device 806 may be a writable storage device media such as non-volatile storage devices for example, SSDs including self-encrypting drives, flash memory devices, and magnetic disks, video tape, optical, DVD, magnetic tape, or any other similar media adapted to store information. The adaptive aspects described herein are not limited to any particular storage device type. Details of using controller 804 are provided below.

The seat box 140 is connected to the seats/smart monitors 132 by a seat interface 812. In one aspect, seat interface 812 provides a wired connection. In another aspect, seat interface 812 may provide a wireless connection with the smart monitors 132.

The seat box 140 is connected to other seat boxes via a switching module 810. The switching module 812 may be an Ethernet switch or any other switch type.

The seat box 140 also communicates with the head-end server 134 via a server interconnect 814. The server interconnect 814 may provide a wired connection or a wireless connection. In another aspect, a server interconnect for redundancy, may provide both a wired connection and the wireless connection. The server 134 has access to server storage 808 that stores media content.

In another aspect, server interconnect 814 provides a wireless connection to each seat box 140, while the seat interface 812 provides a wired connection to each smart monitor 132 in the group of smart monitors connected to that seat box 140. This advantageously requires less routing of wires or cables from the server 134, while permitting content to be wirelessly transmitted from the server 134 and stored in the seat boxes. The wired connection from the seat boxes 140 to the smart monitors 132 ensures fast and reliable streaming of content from a seat box 140 to a smart monitor 132. Hence, an arrangement is provided for convenient wireless loading of seat boxes 140 with content, while maintaining streaming quality to smart monitors. Furthermore, the wireless loading of seat boxes 140 with content may be performed at different speeds. In one aspect, during a maintenance mode, e.g., when an aircraft is on the ground between flights and content is being replaced and/or supplemented at the seat boxes with newer material or software updated, the wireless loading of content and/or data is performed at maximum speed to minimize the time required for loading content. During normal operation, wireless content loading of seat boxes 140 is performed at a slower rate, leaving wireless bandwidth for other uses. The slower rate may be a background task with less quality of service to preserve bandwidth for higher priority tasks, such as viewing of streaming media. Streaming of media for viewing that has only been partially loaded may be permitted so long as a minimum percent of the file has been loaded.

The seat box 140 may also include a power supply module 816 that powers the seat box and may also provide power to other seat boxes and/or to the smart monitors. In another aspect, power for the seat box is provided from a separate power module (not shown), and the seat box provides power therefrom to a plurality of smart monitors and other components, such as another seat box.

It is noteworthy that for convenience, the various functional blocks have been shown as separate components but may be integrated for production/design efficiency. For example, a single interconnect or switch may be used to communicate with the server and other seat boxes.

Figure 9:
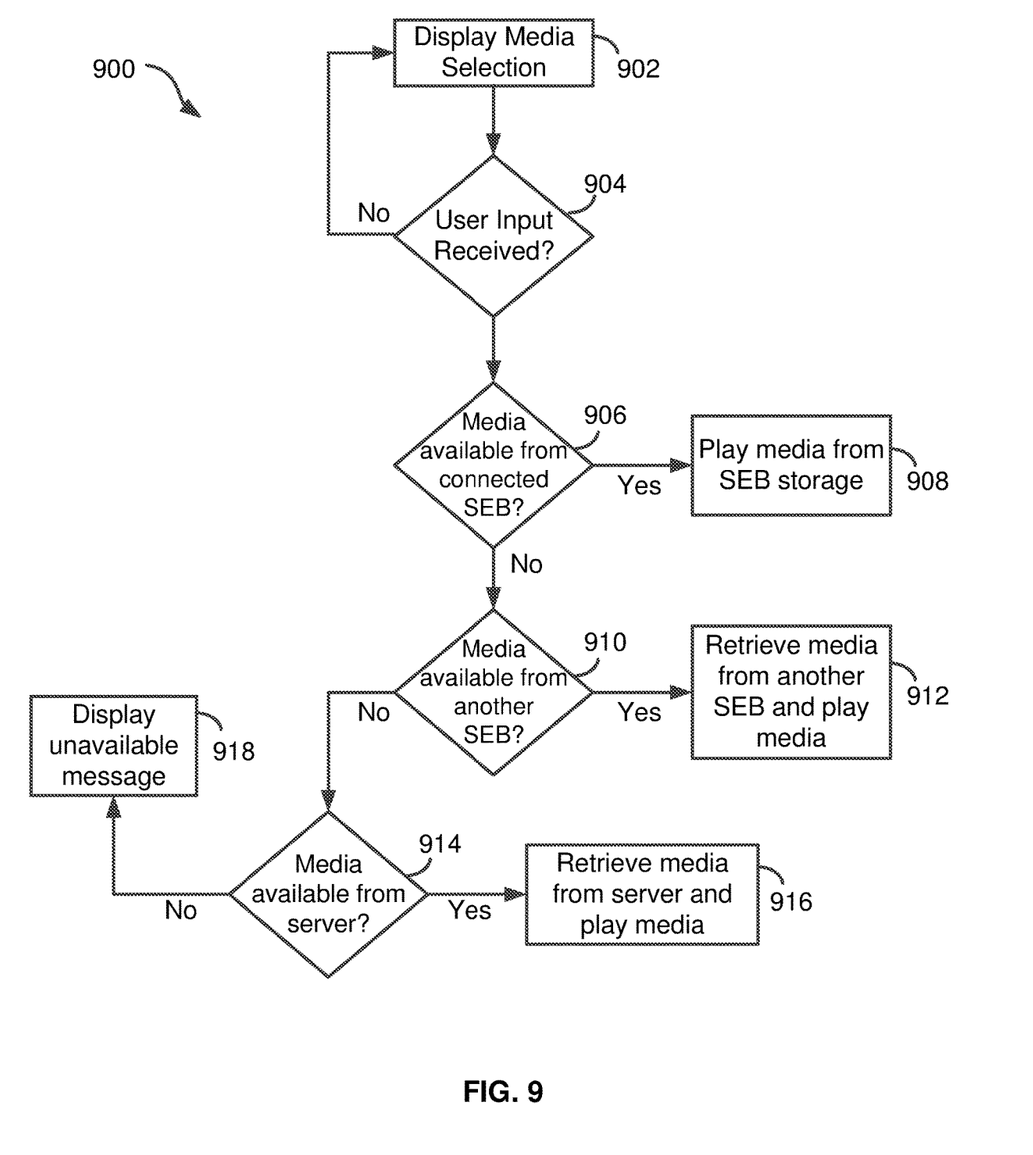
FIG. 9 is a process flow for displaying media content, according to one aspect of the present disclosure.

Referring now to FIG. 9 each smart monitor 132 includes software or program logic to display media selections as indicated in process box 902 of the process flow 900. In this state, the program logic waits for an input from a user or passenger to choose one of the media selections as indicated in decision box 904. The logic initially checks in decision block 906 to determine if a media file corresponding to the selection is available from a first source, for example, storage device 806 of the seat box 140 that is coupled to the smart monitor, the storage device 806 of another seat box that is coupled to the seat box coupled to the smart monitor 132 or the server storage 806.

In one aspect, the process determines whether the media file is stored at storage 806, accessible and managed by controller 804. If so, the logic plays the media file from the first source, i.e., from storage 806 as shown in process block 908 of FIG. 9. Playing media from storage 806 has the advantage of reducing the number of LRUs where media is stored and hence the upgrade process is more efficient.

If a media file corresponding to the media file selection is not available from the first source, i.e., at storage device 806, the program logic proceeds to decision block 910. The logic in decision block 910 determines whether a media file corresponding to the selection is available from a second source. In the example of FIG. 9, the second source is another seat box that is operationally coupled to the seat box of the smart monitor 132 within the same sub-network. If available, the program logic plays the media file from the other seat box in block 912.

If the media file is not available at another seat box, then the program logic in decision block 914 determines whether a media file corresponding to the selection is available from a third source, i.e., server storage 808. When the media file is available, then the logic requests the server 134 to stream the media file to the smart monitor 132 over the network 136 as indicated in process block 916. Upon receipt of the stream, the smart monitor 132 plays the media.

If the media file is not available from the third source, then the logic may display an error message in block 918.

As mentioned above, in some systems 100, there may be a selection of pay-per-view media files. The program logic in the smart monitors 132 preferably decline requests for pay-per-view media files if there is no communication available with the server 134. This is to comply with the standards set forth by the Payment Card Industry (PCI) to ensure a secure environment for payment information. In this regard, the PCI Data Security Standard (DSS) currently prohibits storing credit card data on smart monitors.

Each smart monitor 132 includes program logic for operating a local media server to stream up to a highest conservative quantity of streams it is capable of while running applications, such as games, operating the graphical user interface, or playing a media file, etc.

The preference for whether a source is first, second, third or later in priority for where a smart monitor looks for a media file may be read from a configuration file. The configuration information may be data pre-stored in the smart monitors 132 upon installation in the vehicle 102, a file downloaded from a server 134, or a simple message broadcast along the network 138. In some aspects with high performance servers and/or high speed networks, the first source may be storage device 806 managed by controller 804, the second source may be another seat box storage device and the third source may be server storage 808.

In one aspect, a method for an entertainment system of an aircraft is provided. The method includes receiving an input for a media file at a smart monitor on the aircraft, the aircraft having a plurality of smart monitors and a plurality of seat boxes communicating via a network that includes a first sub-network to connect a first group of the seat boxes, and a computing device that stores a plurality of media files, and a second sub-network to connect a second group of seat boxes and the computing device. The method further includes identifying by the smart monitor that receives the input, a priority associated with the input for selecting a source for streaming the media file; streaming the media file from a first source located at the first data sub-network of the first sub-network, based on the priority, and if the media file is available from the first source; and streaming the media file from a second source coupled to the first source within the first sub-network, based on the priority, and if the media file is unavailable from the first source and available from the second source.

In another aspect, a system, is provided. The system includes a computing device disposed on an aircraft to store a plurality of media files; a plurality of smart monitors disposed on the aircraft to present media selections to passengers corresponding to the plurality of media files; and a plurality of seat boxes disposed in the aircraft connecting the plurality of smart monitors and the computing device in a network. The network comprises a first sub-network for connecting a first group of the seat boxes and the computing device in communication, and a second sub-network connecting a second group of seat boxes and the computing device in communication. A plurality of data sub-networks are located within the first sub-network and the second sub-network, where each data sub-network includes at least a seat box connecting a group of smart monitors from the plurality of smart monitors in communication with the network. A smart monitor in a first data sub-network of the first sub-network receives an input for a media file, and program logic at the smart monitor executes instructions to: identify a priority associated with the input for selecting a source for streaming the media file; stream the media file from a first source located at the first data sub-network of the first sub-network, based on the priority, and if the media file is available from the first source; and stream the media file from a second source coupled to the first source within the first sub-network, based on the priority, and if the media file is unavailable from the first source and available from the second source.

While embodiments may be illustrated or described as having certain components, additional, fewer, or different components may be used or substituted. Further, with respect to described methods or processes, various steps may be performed in different order, and fewer or more steps may be performed by combining or splitting steps, or omitting some steps. In this regard, some decision and process blocks in the program logic were described as optional. In addition, it is possible to have a system that that does not have a server 134 and relies only upon media files stored in local content storage of the smart monitors 132. A portable media loader or onboard media loader in this aspect would incorporate a portable server for transferring media files to the smart monitors 132, but would not remain with the vehicle after the media files or content has been transferred to the smart monitors.

As previously described, the smart monitors 132 preferably use an operating system based on ANDROID. However, other operating systems could be used, such as LINUX or proprietary operating systems available from Microsoft Corporation of Redmond, Wash. or Apple Inc. of Cupertino, Calif., which respectively sell operating systems under the trademarks of WINDOWS and IOS. The servers 134, 204 and 206 preferably use LINUX, but other operating systems could be used as well, such as WINDOWS. When LINUX or ANDROID is used, a Network Block Device is used to make remote servers on the network appear as virtual drives for devices, e.g., a smart monitor 132, searching for files stored thereon.

Instead of wired connections, smart monitors 132 could wirelessly connect over a network either directly with one another or indirectly via a wireless access point. The communication standard could be according to the 802 family (Wi-Fi), BLUETOOTH standard, or other communication standards. If a wireless access point is provided, it could have local content storage and act as another source of media files should a connectivity failure occur. Streaming could provide different quality of service depending on the source, for example, lower speed connections, such as a wireless connection, providing lower quality of service.

Since changes can be made as described, the present examples and embodiments are to be considered as illustrative and not restrictive and the disclosure is not to be limited to the details given herein, but may be modified within the scope and equivalence of the appended claims.

What is claimed is:

1. A method, comprising:
   receiving an input for a media file at a smart monitor on an aircraft, the aircraft having a plurality of smart monitors and a plurality of seat boxes communicating via a network;
   wherein a first sub-network of the network connects a first group of the seat boxes and a computing device that stores a plurality of media files, and a second sub-network of the network connects a second group of seat boxes and the computing device;
   wherein a plurality of data sub-networks are located within the first sub-network and the second sub-network, where each data sub-network includes at least a seat box connecting a group of smart monitors in communication with the network;
   wherein the smart monitor receiving the input is located in a first data sub-network of the first sub-network;
   identifying by the smart monitor, a priority associated with the input for selecting a source for streaming the media file;
   streaming the media file from a first source located at the first data sub-network of the first sub-network, based on the priority, and if the media file is available from the first source; and
   streaming the media file from a second source coupled to the first source within the first sub-network, based on the priority, and if the media file is unavailable from the first source and available from the second source.

2. The method of claim 1, wherein the first source is a first seat box located within the first data sub-network and connected to the smart monitor.

3. The method of claim 1, wherein the second source is another smart monitor located within the first sub-network.

4. The method of claim 1, wherein the first source is the smart monitor that receives the input.

5. The method of claim 1, wherein the second source is a second seat box connected to a first seat box in the first sub-network, the first seat box connected to the smart monitor in the first data sub-network.

6. The method of claim 1, wherein when the smart monitor is streaming the media file from one of the first source and the second source, the smart monitor requests the media file from a different source, upon determining that packet loss during the streaming exceeds an acceptable level.

7. The method of claim 1, wherein the second source is the computing device.

8. A non-transitory machine-readable storage medium having stored thereon instructions for performing a method, comprising machine executable code which when executed by one or more machines, causes the one or more machines to:

receive an input for a media file at a smart monitor on an aircraft, the aircraft having a plurality of smart monitors and a plurality of seat boxes communicating via a network;

wherein a first sub-network of the network connects a first group of the seat boxes and a computing device that stores a plurality of media files, and a second sub-network of the network connects a second group of seat boxes and the computing device;

wherein a plurality of data sub-networks are located within the first sub-network and the second sub-network, where each data sub-network includes at least a seat box connecting a group of smart monitors in communication with the network;

wherein the smart monitor receiving the input is located in a first data sub-network of the first sub-network;

identify by the smart monitor, a priority associated with the input for selecting a source for streaming the media file;

stream the media file from a first source located at the first data sub-network of the first sub-network, based on the priority, and if the media file is available from the first source; and stream the media file from a second source coupled to the first source within the first subnetwork, based on the priority, and if the media file is unavailable from the first source and available from the second source.

9. The non-transitory machine-readable storage medium of claim 8, wherein the first source is a first seat box located within the first data sub-network and connected to the smart monitor.

10. The non-transitory machine-readable storage medium of claim 8, wherein the second source is another smart monitor located within the first sub-network.

11. The non-transitory machine-readable storage medium of claim 8, wherein the first source is the smart monitor that receives the input.

12. The non-transitory machine-readable storage medium of claim 8, wherein the second source is a second seat box connected to a first seat box in the first sub-network, the first seat box connected to the smart monitor in the first data sub-network.

13. The non-transitory machine-readable storage medium of claim 8, wherein when the smart monitor is streaming the media file from one of the first source and the second source, the smart monitor requests the media file from a different source, upon determining that packet loss during the streaming exceeds an acceptable level.

14. The non-transitory machine-readable storage medium of claim 8, wherein the second source is the computing device.

15. A system, comprising:

a computing device disposed on an aircraft to store a plurality of media files;

a plurality of smart monitors disposed on the aircraft to present media selections to passengers corresponding to the plurality of media files; and a plurality of seat boxes disposed in the aircraft connecting the plurality of smart monitors and the computing device in a network;

wherein the network comprises a first sub-network for connecting a first group of the seat boxes and the computing device in communication, and a second sub-network connecting a second group of seat boxes and the computing device in communication;

wherein a plurality of data sub-networks are located within the first sub-network and the second sub-network, where each data sub-network includes at least a seat box connecting a group of smart monitors from the plurality of smart monitors in communication with the network;

wherein a smart monitor in a first data sub-network of the first sub-network receives an input for a media file, and program logic at the smart monitor executes instructions to:

identify a priority associated with the input for selecting a source for streaming the media file;

stream the media file from a first source located at the first data sub-network of the first sub-network, based on the priority, and if the media file is available from the first source; and stream the media file from a second source coupled to the first source within the first subnetwork, based on the priority, and if the media file is unavailable from the first source and available from the second source.

16. The system of claim 15, wherein the first source is a first seat box located within the first data sub-network and connected to the smart monitor.

17. The system of claim 15, wherein the second source is another smart monitor located within the first sub-network.

18. The system of claim 15, wherein the first source is the smart monitor that receives the input.

19. The system of claim 15, wherein the second source is a second seat box connected to a first seat box in the first sub-network, the first seat box connected to the smart monitor in the first data sub-network.

20. The system of claim 15, wherein when the smart monitor is streaming the media file from one of the first source and the second source, the smart monitor requests the media file from a different source, upon determining that packet loss during the streaming exceeds an acceptable level.

* * * * *